(12) United States Patent
Dunham et al.

(10) Patent No.: US 10,701,377 B2
(45) Date of Patent: Jun. 30, 2020

(54) MEDIA STORAGE

(71) Applicant: Amazon Technologies, Inc., Reno, NV (US)

(72) Inventors: Jeremiah M. Dunham, Portland, OR (US); Andrew Tunall, Portland, OR (US); Benjamin Black, Portland, OR (US); Kristopher Kosmatka, Portland, OR (US); Benjamin Aldouby Schwartz, Portland, OR (US); Jason LaPier, Portland, OR (US); Justin Abrahms, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 170 days.

(21) Appl. No.: 15/265,513

(22) Filed: Sep. 14, 2016

(65) Prior Publication Data
US 2018/0077420 A1    Mar. 15, 2018

(51) Int. Cl.
*H04N 21/2343*  (2011.01)
*H04N 19/37*  (2014.01)
(Continued)

(52) U.S. Cl.
CPC .......... *H04N 19/37* (2014.11); *G06F 16/113* (2019.01); *G06F 16/70* (2019.01); *G06F 16/71* (2019.01);
(Continued)

(58) Field of Classification Search
CPC ........................ H04N 19/37; H04N 21/2343
See application file for complete search history.

(56) References Cited

U.S. PATENT DOCUMENTS 8,977,660 B1 *  3/2015  Xin ................... H04N 21/23103
                                                       707/747
9,380,326 B1 *  6/2016  Corley .............. H04L 29/06482
                                (Continued)

FOREIGN PATENT DOCUMENTS

CN   109791557   5/2019
EP    3513323    7/2019
                          (Continued)

OTHER PUBLICATIONS

Olson, Jack E., "Setting Archive Policies", Setting Archive Policies, pp. 149-159, Nov. 25, 2008, Morgan Kaufmann Publishers, Inc., US, ISBN: 978-0-12-374720-4.
(Continued)

*Primary Examiner* — Rowina J Cattungal
(74) *Attorney, Agent, or Firm* — Hogan Lovells US LLP

(57) ABSTRACT

A user of a storage system can upload files for a media asset, which can include a high quality media file and various related files. As part of the upload process, the storage system can extract metadata that describes the media asset. The user can specify one or more lifecycle policies to be applied for storage of the asset, and a rules engine can ensure the application of the one or more policies. The rules engine can also enable the use of simple media processing workflows. A filename hashing approach can be used to ensure that the segments and files for the asset are stored in a relatively random and even distribution across the partitions of the storage system. As part of the lifecycle for the asset, the high quality media file can be moved to less expensive storage once transcoding of the asset or another such action occurs.

20 Claims, 8 Drawing Sheets

(51) Int. Cl.
*G06F 16/71* (2019.01)
*G06F 16/73* (2019.01)
*G06F 16/738* (2019.01)
*G06F 16/78* (2019.01)
*G06F 16/11* (2019.01)
*G06F 16/70* (2019.01)

(52) U.S. Cl.
CPC ............ *G06F 16/73* (2019.01); *G06F 16/738* (2019.01); *G06F 16/7867* (2019.01); *H04N 21/2343* (2013.01)

(56) References Cited

U.S. PATENT DOCUMENTS

| | | | |
|---|---|---|---|
| 9,501,212 B2 | 11/2016 | Marshall | |
| 10,191,954 B1* | 1/2019 | Corley | G06F 16/258 |
| 2013/0166580 A1* | 6/2013 | Maharajh | H04L 65/605 |
| | | | 707/758 |
| 2014/0282762 A1* | 9/2014 | Bjordammen | H04N 21/4667 |
| | | | 725/92 |
| 2016/0149956 A1* | 5/2016 | Birnbaum | H04L 63/101 |
| | | | 726/1 |
| 2018/0063591 A1* | 3/2018 | Newman | H04N 21/44 |

FOREIGN PATENT DOCUMENTS

| | | |
|---|---|---|
| JP | 2007-272540 | 10/2007 |
| JP | 2008-543124 | 11/2008 |
| JP | 2012-528542 | 11/2012 |
| JP | 2012-529685 | 11/2012 |
| JP | 2014-225143 | 12/2014 |
| JP | 2019-533233 | 11/2019 |
| WO | 2018/053015 | 3/2018 |

OTHER PUBLICATIONS

"Intelligent Data Management Required When Implementing a Modern Storage Infrastructure", URL: http://cognitiveimpact.com/media/technicalpapers,WP Arkivio Arkivio Autostor.pdf, Sep. 30, 2014, XP055261732.

International Search Report and Written Opinion issued in International Application No. PCT/US2017/051385 completed on Oct. 30, 2017.

International Preliminary Report on Patentability issued in International Application No. PCT/US2017/051385 completed on Mar. 28, 2019.

First Office Action issued in Japanese Patent Application No. 2019-514290 dated Apr. 7, 2020.

\* cited by examiner

MEDIA STORAGE

BACKGROUND

Users are increasingly obtaining content in digital form, often downloading or streaming that content from a remote service. The content is often uploaded in a high quality format, and transcoded into various other formats appropriate for playback on various types of devices. The storage of the high quality version along with the transcoded versions can be quite expensive in some storage systems, and it can be difficult to associate the various versions and enable customers to manage their various assets.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the storage of large files, such as high quality multimedia files, in a storage environment. A customer or other user of the storage system can upload media or other such content into the storage system. As part of the upload process, the storage system can extract media metadata that describes the media files being uploaded. The files can be related files uploaded as part of a media asset. As part of the upload process, or as part of a separate process, the customer can specify one or more lifecycle policies to be applied to the storage of the media asset. A component such as a rules engine can ensure the management and application of the one or more policies to the storage of the media asset. Such a rules engine can also enable the use of simple media processing workflows. For example, a workflow can be specified that uploads a high resolution video file, or mezzanine file, transcodes that automatically into one or more specified output formats, then shortly thereafter causes the mezzanine file to be archived to lower cost storage. A filename hashing approach can be used to ensure that the segments and files for the asset are stored in a relatively random and even distribution across the partitions of the storage system. As part of the lifecycle process, the high quality media file can be moved to less expensive storage after a determined event occurs, such as the asset being transcoded into one or more related transcode files.

Various other such functions can be used as well within the scope of the various embodiments as would be apparent to one of ordinary skill in the art in light of the teachings and suggestions contained herein.

Figure 1:
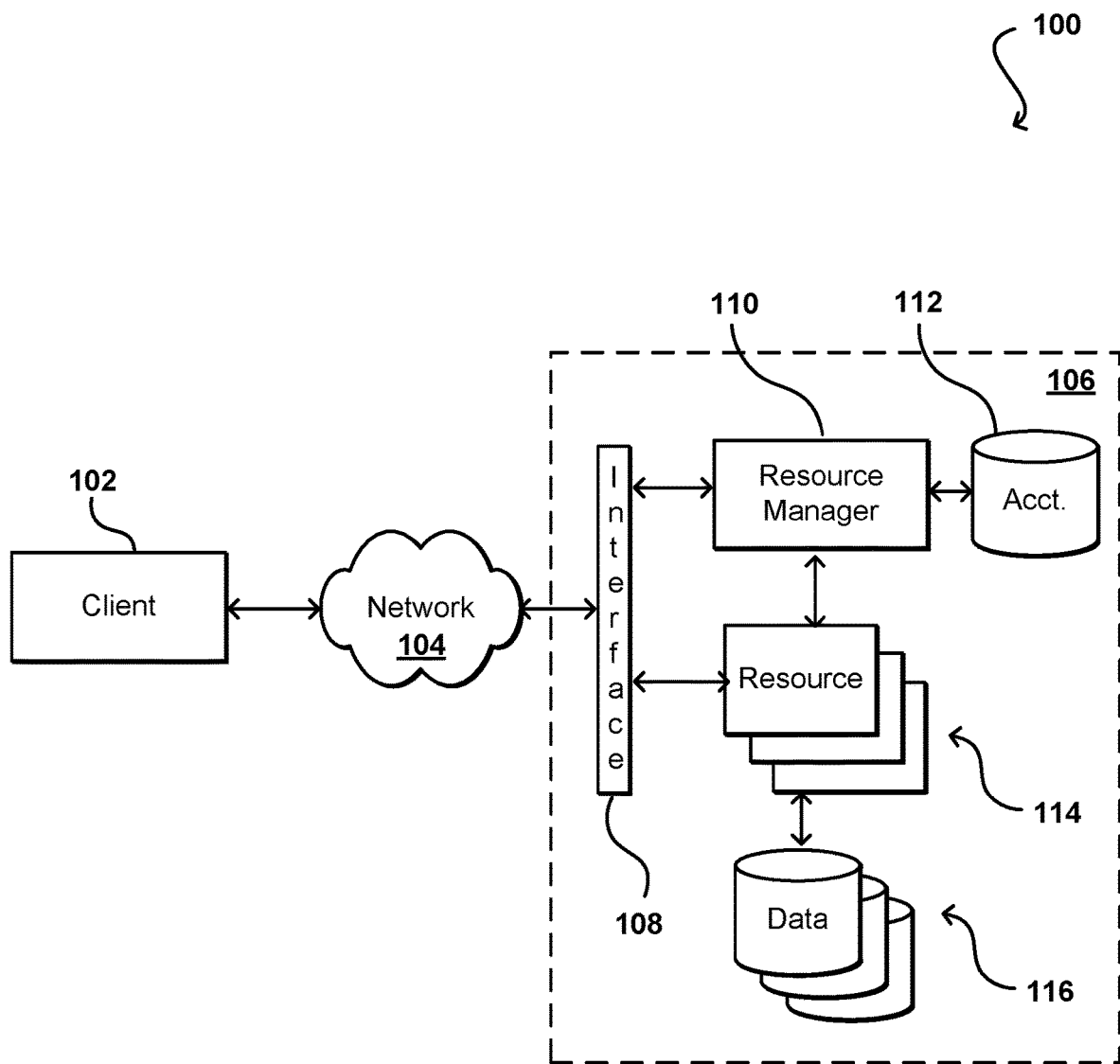
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
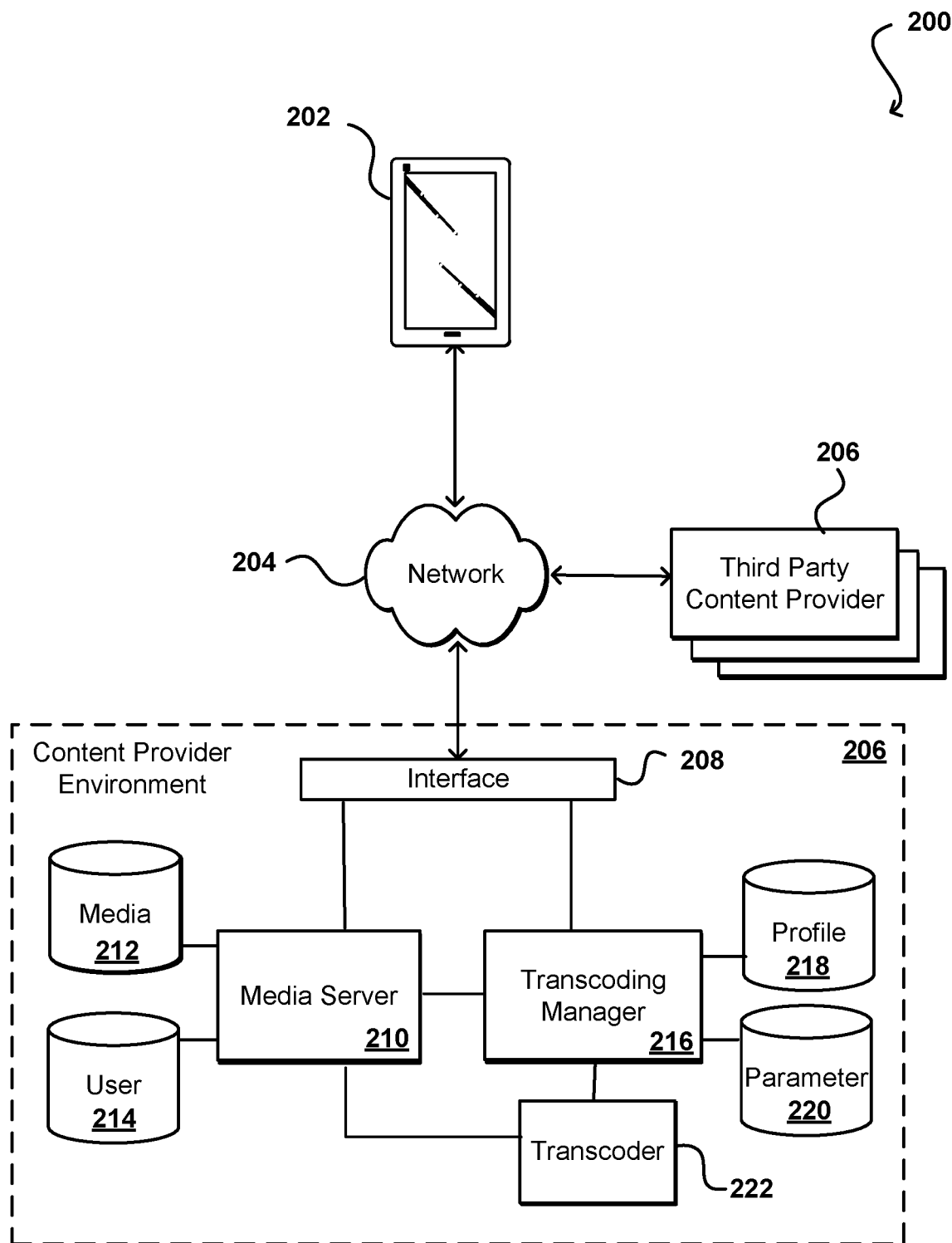
FIG. 2 illustrates an example subsystem for managing media file transcoding that can be utilized in accordance with various embodiments.

FIG. 2 illustrates an example system 200 that can be used to implement aspects of the various embodiments, in an electronic environment such as that discussed with respect to FIG. 1. In the system of FIG. 2, a client computing device 202 can submit a request for content across at least one network 204 to be received by a content provider environment 208. As mentioned, in at least some embodiments the request can include a request for content to be displayed on the computing device 202, and in many cases will include video or other media content that is transcoded for presentation on the client device 202. The network(s) can include any appropriate network, such as the Internet, a local area network (LAN), a cellular network, an Ethernet, or other such wired and/or wireless network. The content provider environment 208 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device. An interface layer 208, when receiving a request or call, can determine the type of call or request and cause information to be forwarded to the appropriate component or sub-system. For example, a request for content might be forwarded to a media server 212 while a request to specify encoding parameters might be forwarded to a transcoding manager 216, among other such options. These calls or requests can also come from third parties, although third party providers 506 can also provide at least some of the media content to be stored to a media repository 212 and transcoded for display on the client device 202 as discussed herein.

In this example, a call received to the content provider environment 208 can be received by an interface layer 210 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to one or more media servers 210, which can obtain the content from a media data store 212 or other such repository to be sent back across the network(s) to the computing device. In some embodiments, information for the request might also be compared against user data in a user data store 214 or other such location to determine, for example, whether the user has access rights to that content, and potentially the formats or versions to which the user has access rights.

In at least some embodiments a request from an operator, an administrator, a client device 202, a third party provider 224, or another such source might include a request to specify one or more sets of encoding parameters to be used with a media file. Accordingly, information regarding the encoding parameters can be provided to a transcoding manager 216, or other such component or service, that is able to receive the information through an appropriate interface (i.e., an API or console) and cause the profile and parameter data to be stored to appropriate repositories 218, 220 as discussed elsewhere herein. When a request for a video file is received, the transcoding manager 216 can use the profile and parameter data to determine the appropriate encoding information, and can pass that to one or more transcoders 222, which can obtain the media file and transcode the media file per the transcoding information, which can then be provided to the client device by a media server 210 or other such component.

In some embodiments the transcoding subsystem includes one or more transcoders, a set of bitstreams (or video signals), and a content delivery network. The one or more transcoders can include both encoders and packagers, which can be implemented via an origin server. A packager can receive a signal (e.g., feed), such as a video signal or a live stream. The live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to the content delivery network (CDN). The bitstreams can represent various encoded/packaged versions of the signal feed, as may be encoded per the encoding parameters from the transcoding manager 216. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The origin server may be configured to perform a content invalidation. For example, one or more of the content segments may be invalidated. Content invalidation may prevent and/or stop content from being delivered to the client devices. To initiate an invalidation of content the operator may send the invalidation signal input (e.g., the operator initiated content invalidation) to the origin server. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN. For example, the client device may request the manifest file and when the TTL value expires for the cached manifest in the various nodes of the CDN, the updated manifest file (e.g., the invalidated manifest) may be distributed throughout the CDN to the client device.

A change in video stream may be initiated by a user in one example. In another example, a quality of service test may be implemented. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example manifest file can include various data, such as a file header, metadata, and/or pointers/links. The data can be human-readable or coded using an encoded format, an encrypted format and/or computer readable (e.g., binary) format. The format of the data in the manifest file may be varied according to the design criteria of a particular implementation. The file header can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. In some embodiments, the pointers may be implemented as a RTMP link and/or an FTP link. The format of the pointers may be varied according to the design criteria of a particular implementation. The pointers of the manifest file can point to the respective content segments. The content segments in some embodiments can be implemented as Transport Stream (e.g., .ts) files. For example, the content segments may comprise MPEG-2 data. In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

As mentioned, many conventional shared-resource environments have difficulty managing aspects of media storage such as media lifecycle management and processing. As an example, various media providers may want to retain the original, high quality media file in storage, but for high resolution video and other content the size of the file can be quite large. The size of this file, often referred to as a mezzanine file, can cause the storage to be quite expensive for the media provider. The media provider in many cases would prefer to have the mezzanine file available for tasks such as transcoding into highly-compressed and lower quality output formats, then no longer have to store the mezzanine file in expensive storage. This could include, for example, archiving the large mezzanine file into a less expensive type of storage. Conventional systems do not provide a convenient and automated way to provide and manage such a process, including the management of data and files associated with the media content.

Accordingly, approaches in accordance with various embodiments can provide an improved upload and management approach that can be particularly beneficial for media and other content providers. In at least some embodiments, a customer or other user of the system can upload media or other such content into the storage system. As part of the upload process, the storage system can extract media metadata and parse any additional media-specific industry standard formats for metadata that describe the media files being uploaded. This metadata can be stored to a dedicated metadata repository or other such accessible location. As part of the upload process, or as part of a separate process, the customer can specify one or more lifecycle policies to be applied to the storage of the media file. A component such as a rules engine can then ensure the management and application of the one or more policies to the storage of the media file. As an example, a customer might specify to store any media file over one hundred gigabytes in size to archival storage after an initial transcode into at least one compressed format. Such a rules engine can also enable the use of simple media processing workflows. For example, a workflow can be specified that uploads a high resolution video file, or mezzanine file, transcodes that automatically into one or more specified output formats, then shortly thereafter causes the mezzanine file to be archived to lower cost storage.

Figure 3:
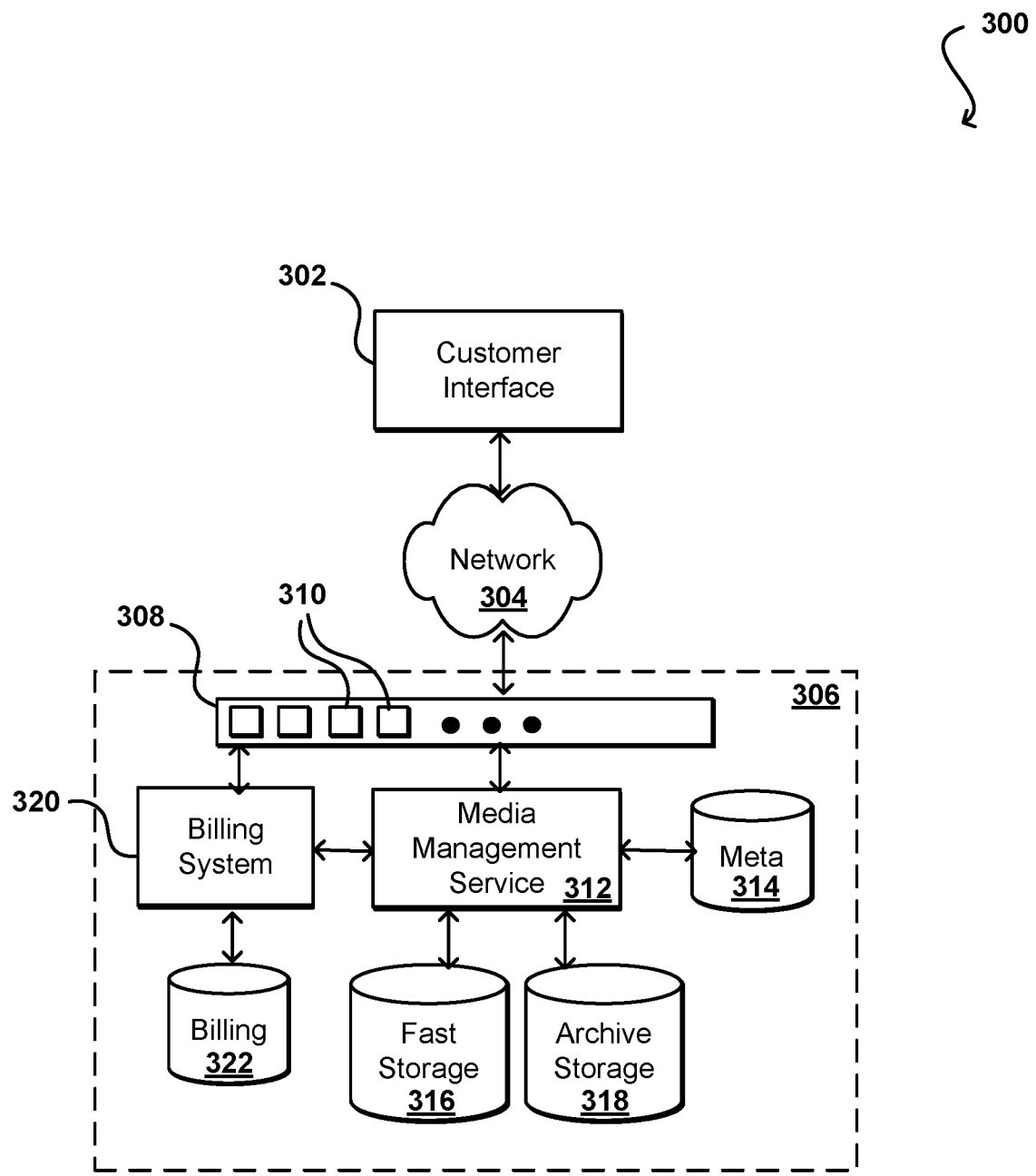
FIG. 3 illustrates an example subsystem for managing the storage of content to fast and archived storage locations that can be utilized in accordance with various embodiments.

FIG. 3 illustrates an overview of an example system 300 that can be used to manage the upload of such a media file in accordance with various embodiments. In this example, a customer can utilize a customer interface 302, as may be provided through an application executing on a client device, to upload a high quality media file over at least one network 304 to be received by an interface 310 of an interface layer 308 of a resource provider environment 306. Information for the uploaded file can be directed to a media management service 312, which can include a rules engine and various other components as discussed and suggested elsewhere herein. The media service 312 can analyze the upload to locate and extract the appropriate metadata, which can be stored to a metadata repository 314 or other such location in the resource provider environment 306. The media management service can also determine, from the upload or other instructions previously provided by the customer, any rules or policies that should be applied to the processing and/or storage of the uploaded media file. In this example, an applicable rule could cause the media content to be stored to fast storage 316, such as a high speed, high availability solid state storage. The media file can then be processed according to the applicable rules and/or policies. In this example, the media file could be processed by the media management service 312 while stored to the fast storage 316, and can then be moved to archival storage 318 after processing is complete. The archival storage, also sometimes referred to as cold storage, may be slower or lower accessibility storage that is less expensive, such as may involve simple disk drive configurations or other such storage. In some embodiments lower storage tiers will have lower accessibility, particularly where data requires only proof of existence and potentially location for reporting. This can be moved to very cheap storage, including off-site tape vaults and other such storage. The metadata stored for the media file to the metadata repository 314 can be managed by the media management service 312 to apply to the media file when stored to either of the fast storage 316 or archival storage. The information regarding the storage of the media file to different types of storage can be provided to a billing system 320, which is shown here to be part of the resource provider environment but could be external to that environment in other embodiments. The billing system can store the information to a billing data repository 322, or other such location, so the customer is billed appropriately for the amount of time the file was stored to fast storage 316 and the amount of time during a billing cycle the file was stored to archival storage 318, as well as other relevant charges.

Figure 4:
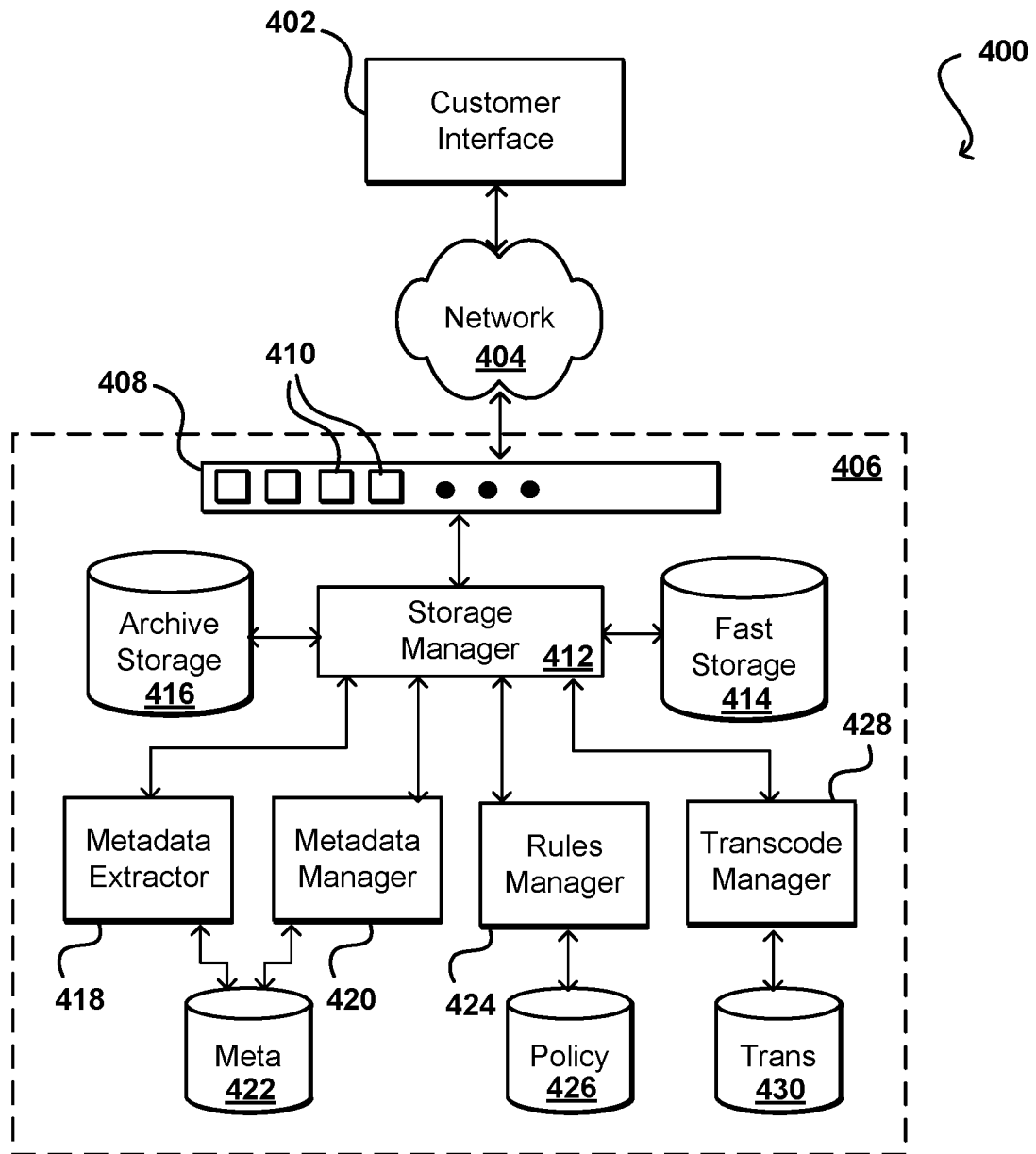
FIG. 4 illustrates an example system for managing the storage of assets that can be utilized in accordance with various embodiments.

In some embodiments, a storage system proxy can be used to receive upload requests from various customer or other such entities. This can include, for example a dedicated address, interface, or uniform resource locator (URL) that the customer can use to upload the media file. Upload requests received to the provided address can be processed using the approaches discussed and suggested herein, while requests received to a conventional upload address can be processed using conventional or other approaches. Additional interfaces can be provided for other tasks, such as to query metadata or request additional transcodes, among other such options. A media file received to the dedicated address or interface can be processed using a metadata extractor 418, such as is illustrated in the example system 400 of FIG. 4. A storage manager 412 receiving the media file from a customer interface 402 through the dedicated interface 410 of the interface layer can direct the media file to be processed by the metadata extractor 418, which can cause basic information to be extracted from the media file, as may include information such as format, bitrate, file size, and the like. Another interface 410 of the interface layer 408 can enable a customer to specify additional metadata attributes, which can include customized attributes in at least some embodiments. The attributes can include key-value pairs or other such formats. Industry standard metadata formats (e.g., XML) can also be parsed to determine the relevant attributes to store for the media file.

Once the metadata is extracted by the metadata extractor 418 and stored to an appropriate location such as a metadata repository 422, a metadata manager can utilize that metadata in the management of the media file. The ability to utilize a metadata manager 420 with a storage manager 412 as discussed herein enables media assets to be managed as well. As used herein, a media "asset" refers to a logical collection of files that include not only the source media file, but can also include additional files as may relate to additional text, metadata, and other supplemental content. A media management method associated with one or more relevant interfaces 410 can introduce the concept of an asset as a first class object type. When a customer uploads an asset, the asset can include all relevant files for the media content. The files can be stored separately in fast storage 414 and/or archival storage 416 in the resource provider environment 406, but the files can be treated as a logical group. The storage manager 412 can track the relationships between the files to keep them logically grouped together. As discussed elsewhere herein, in at least some embodiments a new primitive can be generated for the asset that enables a user to run queries or perform tasks with respect to the primitive. The primitive can be hierarchical so as to reflect the asset and sub-assets, wherein tasks of the workflow can be executed against the appropriate level(s) of the hierarchy. Further, a customer can utilize an API or other such interface to execute queries against the asset primitive and associated metadata. Lifecycle management performed by a rules engine or other such system or service can also manage the lifecycle tasks against the asset primitive in order to ensure that the task is performed and applied for all relevant files for the asset.

An important aspect to the management of an asset by the storage manager 412 relates to the management of the names of files associated with that asset. These names can include not only the name of the file, but also other names that can be used to manage those assets. For example, if a video asset is part of a series of assets, then it would be desirable to extract and store that metadata, in order to enable queries or other operations to be performed that can identify or process all assets relating to that series. Other such names or identifiers can include title portions, seasons, episodes, episode titles, and other such information. The metadata can be stored as a source of truth in a table that, in at least some embodiments, will not be in archival storage for at least some assets where one or more versions of the content are also not stored in archival storage 416. New interfaces (e.g., APIs) and methods can enable a customer to query for assets based at least in part upon any of these names or identifiers. In some embodiments a customer uploading a media asset will have the option of assigning a name to that asset which can be applied to all related files.

In addition to asset-level metadata, the storage manager can also manage time code-specific metadata. For some types of content, such as sporting events, there can be events that happen at specific times in the playback timeline. These can include, for example, the points at which a pitch occurs in a baseball game or a play occurs in a football game, among other such options. It thus might be desirable for content providers to index the media content using the time code information, and enable customers or other users to query the content for specific types of information. As an example, a producer might want to pull a highlight reel showing the last three batters that struck out swinging in a baseball game. In such an example, the video content could have pitch-by-pitch metadata associated with time codes in the video itself such that those segments of the video can be quickly identified and retrieved.

The storage manager 412 can include, or work with, a rules engine that may be part of a rules manager 424 or other such system or service. The rules manager 424, as mentioned previously, can manage various rules and policies to be applied or enforced for various media objects. The rules manager 424 can also manage the various workflows dictated by those rules or policies, as well as may be part of the media lifecycles. This can include, for example, the ability to specify metadata-based queries for a received and stored media asset. In some embodiments, a customer can specify metadata-based queries that can be in plain language or query language, among other such options. As an example, a customer can specify to archive all mezzanine files to archival storage 416 twenty-four hours after those files are uploaded and received by the storage manager or another such system or service. A customer could also specify to move all assets with metadata relating to a specific holiday, such as New Year's, from archival storage 416 to fast storage 414 at 30 days before that holiday. As part of the lifecycles or otherwise, the rules engine can also have the ability to initiate transcoding jobs or other such tasks. In some embodiments this can be implemented using a background scheduling process, among other such options. The relevant API or other such interface can enable a customer to specify the rules and activate or deactivate the rules. A back end process can then periodically scan the index, running the active queries to determine matching assets and taking the appropriate action(s) specified by the respective customers.

In some systems a customer can specify an XML file for a transcoding job, indicating information such as the input and output formats, appropriate names, and other such information. These files can be used with transcoding jobs triggered by the rules manager 424 as well, which can indicate how files associated with an asset should be processed. If the transcoding engine is offered via software as a service, as opposed to a dedicated system in the environment, then the service can be called to execute the transcoding of the media file. Otherwise, a set of servers or other such systems can be maintained that host the appropriate transcoding engine(s) for the media assets.

In some embodiments, a customer-facing interface 410 can be a Web services representational state transfer (REST) API. The interface can allow for the specification of various types of information presented herein, as may relate to the storage proxy, the metadata extraction and management, asset support, and rule/policy/workflow specification, among other such options. Customers can also be provided with one or more software development kits (SDKs) for various languages that provide the tools needed for customers to communicate with the appropriate customer interface. The API can then communicate with the various subsystems discussed herein, as may include the name hashing service, metadata service, and rules management service, among others.

As mentioned, in many instances a customer will want the high quality mezzanine file stored in fast storage 414 at least until such time as the file is transcoded into the appropriate format(s). The storage manager 412 in this example can work with a transcode manager 428 to cause the appropriate transcoding jobs to be performed. This can be accomplished using transcoding data stored to a transcoding repository 430 or other such location. Once generated, the various files in the specified formats can be stored to fast storage 414 and/or any other appropriate location for access by authorized users or entities. The high quality mezzanine file can then be moved from the fast storage 414 to the archival storage 416 according to the rules or policies specified by the customer and managed by the rules manager 424. The storage manager 412 can also work with the metadata manager 420 to ensure that the appropriate metadata and other information for the asset is associated with the transcoded files in the fast storage as well as the mezzanine file in archival storage.

In this example, the metadata manager 420 or storage manager 412 can also be responsible for filename management, including hashing or other such functionality used for the various filenames. It should be understood, however, that a separate filename manager could be used as well in various embodiments. Further, certain storage systems can generate and manage their own filenames and hashes, such that a separate component or process may not be required. In this example, the fast storage service can distribute files across a number of different partitions. A number of media files might have similar names, particularly where each file is associated with a show or series. For a file named TestFile1, the source file could be transcoded into HLS segments, for example, where a one hour video file might be broken down into a number of two second long segments. Using a conventional approach, the segments might be named TestFile1-001, TestFile1-002, TestFile1-003, and so on. If the hash is generated using the beginning of the filename to determine the appropriate partition for that file, as in certain conventional systems, the filenames will all hash to the same values so they will all be stored to the same partition on the disk.

Accordingly, approaches in accordance with various embodiments generate a new hash code, such as a (secure hashing algorithm) SHA-256 based hash, which is a cryptographically secure hash of the filename. A benefit to a hashing algorithm such as a SHA-256 generator is that the algorithm examines the entire filename, such that each filename would hash to a different hash code. The different hash codes can then enable the distribution of those files to be relatively random and even across the disk storage. This helps performance of the storage system by avoiding hot spots to ensure that throughput remains sufficiently high.

Figure 5:
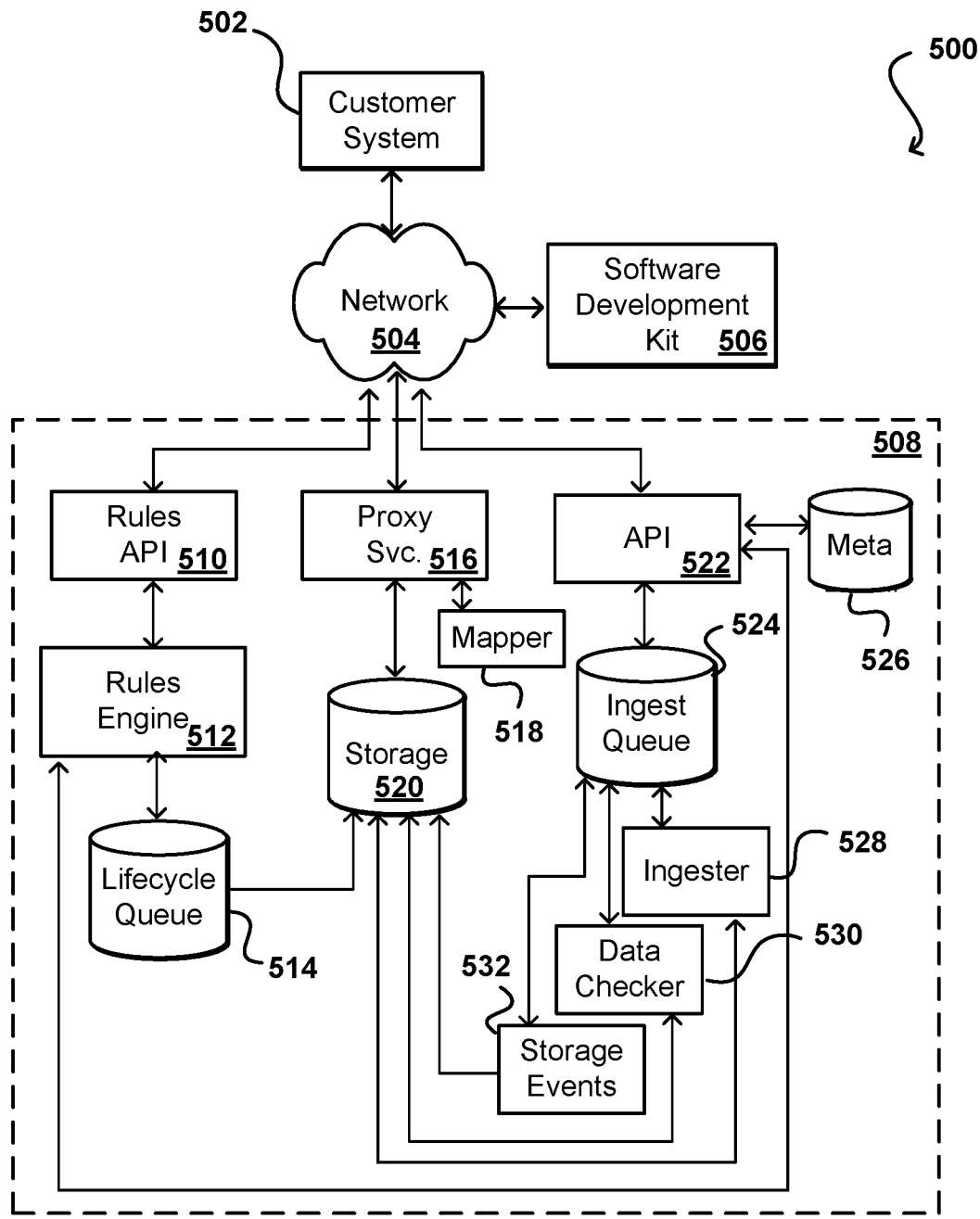
FIG. 5 illustrates another example system for managing asset storage that can be utilized in accordance with various embodiments.

FIG. 5 illustrates another example system 500 that can be utilized in accordance with various embodiments. In this example, a customer can use a customer system 502 and/or software development kit 506 to make calls across at least one network 504 into the resource provider environment 508. As discussed previously, such an environment can include a number of APIs or other interfaces that enable the customer to communicate with the resources of the environment. One of these APIs corresponds to a storage proxy service 516, which the customer can use to upload files or assets to be stored in storage 520 of the resource provider environment 508. The customer can perform the upload as a multi-part upload or in a compressed format file (e.g., a .zip file), for example, that can contain the relevant files or components of the asset. A mapping component 518 in this example can generate the hash code filenames using an appropriate hashing algorithm, and can store the mapping of the hash code versus the original file name. The mapping component 518 can also correlate the hash codes with the components or files for the asset stored at various locations throughout the environment, and the mappings themselves can be stored to a database table or other appropriate location. The proxy service 516 can cause the individual components of the asset to be stored to the appropriate storage 520, such as fast storage in at least some embodiments. In some embodiments the storage 520 can be provided as part of a storage service that has various storage events 532 available, such that messages based on those events can be published to trigger various scripts to execute in the environment. For example, an event corresponding to the uploading of a file to the storage service can trigger a script to run that places a job into an ingest queue 524. The job can indicate that the file needs to be analyzed and ingested by an appropriate ingester 528 of the environment. Ingest jobs can be pulled from the ingest queue 524 and processed in parallel at high scale in at least some embodiments. The ingester 528 can perform tasks on the file such as to extract the metadata for a media file or parse and process the metadata from a metadata XML file, among other such options. Once the metadata is obtained, the metadata can be stored to a metadata repository 526 or other such location associated with the media file in storage 520.

A data integrity checker 530 can also be used to verify the integrity of the uploaded data. In at least some environments the storage events are not guaranteed and can be lossy. It is thus possible that the uploading of an asset would not result in an upload event firing, such that the script would not be triggered. The data integrity checker can run in the background to periodically query the appropriate table index to determine whether there are media files for which the metadata has not yet been determined and processed. This helps to prevent loss of the event. It should be pointed out, however, that in at least some embodiments a customer could call into the proxy service 516 and provide their own metadata, or could provide the metadata directly to an appropriate metadata API 522. That API can also enable the customer or other users to query the metadata stored in the metadata repository 526. These can include queries such as to show any assets that have an HLS transcoded version in storage, to provide information for the largest asset, or to show all assets associated with a particular title, as examples.

The system 500 illustrated in FIG. 5 also includes a rules API 510 that enables the customer to, directly or through the SDK 506, call the rules API to define the lifecycle rules that can be executed by the rules engine 512. The rules engine can execute queries that are defined in the rules table against the metadata API 522 to identify any matching assets. For any assets that match, the rules engine 512 can create a job message that will go into lifecycle queue 514. The jobs can be processed from the queue to perform tasks such as to move files between different storage classes or run video transcoding jobs, among other such options. A customer can submit or define a lifecycle policy for any of a number of different reasons. For example, a customer might specify that any version of an asset that is accessed less than once per day should be moved to infrequent access storage. The access frequency can be determined by analyzing event logs or aggregating statistical usage data, among other such options.

An advantage to storing assets in such an environment is that advertisements can be processed to match any format being provided through the transcoding of an asset. The audio can then match that of, for example, a live stream into which an advertisement is being inserted. Further, the video quality of the advertisement can be adjusted to match that of the current stream, and the switch between the ads and the live stream can be virtually seamless and not noticeable to a viewer.

Figure 6:
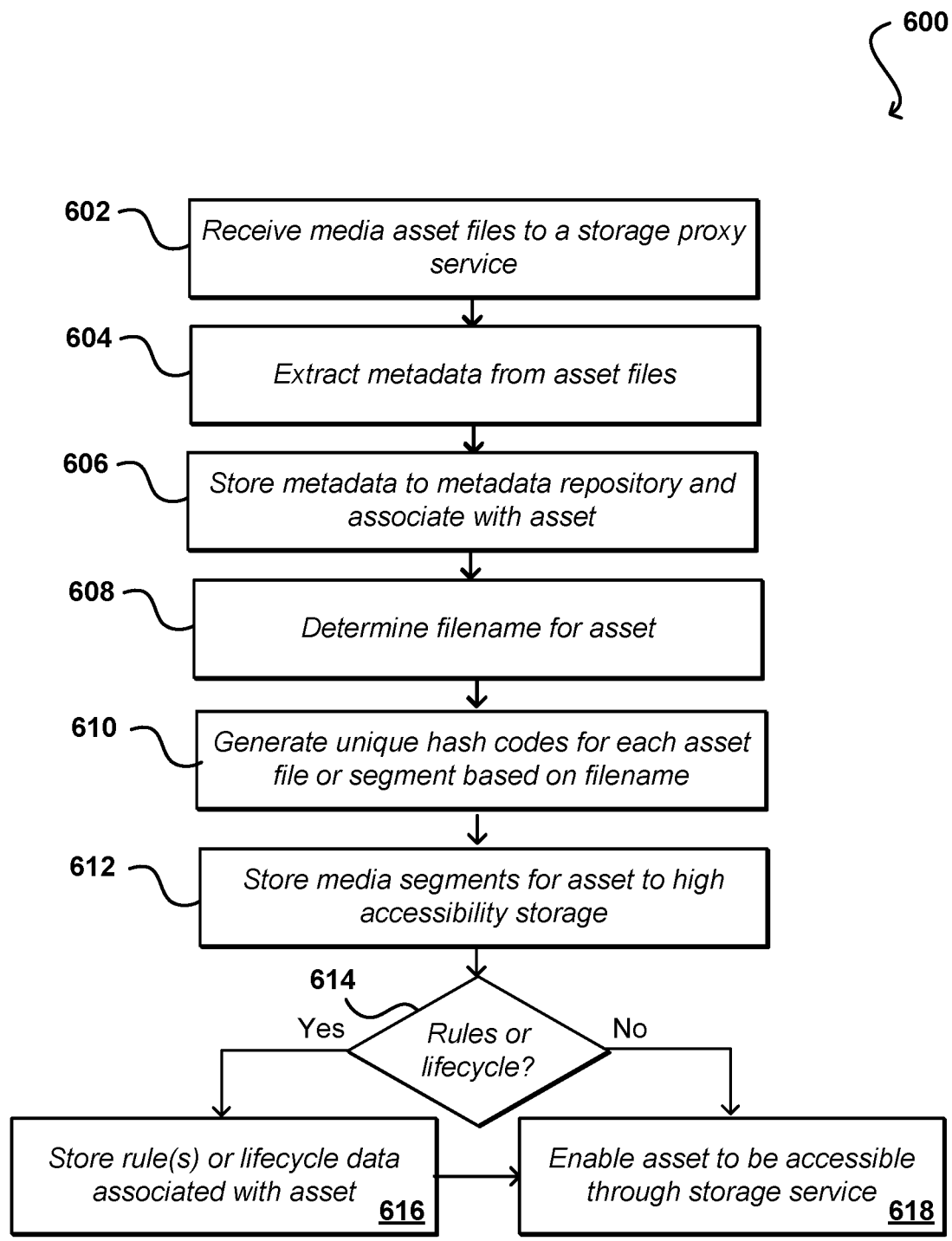
FIG. 6 illustrates an example process for enabling an uploaded asset to be stored by a storage service that can be utilized in accordance with various embodiments.

FIG. 6 illustrates an example process 600 for enabling an asset to be stored by a storage service that can be utilized in accordance with various embodiments. It should be understood that for any process herein there can be additional, fewer, or alternative steps performed in similar or alternative orders, or in parallel, within the scope of the various embodiments unless otherwise specifically stated. In this example, the files for a media asset are received 602 to a storage proxy service, such as by being received to a proxy URL or other such address or interface. As mentioned, the media asset can include a primary high-quality media file, as well as other files that may contain text, metadata, or other related information. The metadata can be extracted 604 from the media files, whether from the main media file or an associated file, using any of various processes discussed and suggested herein. The metadata can then be stored 606 to a metadata repository and associated with the media asset.

A filename for the asset can be determined 608, which can be based on a filename provided with the asset, provided by the customer, or otherwise generated. As mentioned, a hashing algorithm can be used to generate 610 unique hash codes based on the filenames, including any variations utilized for different files or segments. These filenames in at least some embodiments can be mapped back to the original asset via a mapping table. The media segments for the asset can then be stored 612 to high accessibility storage, or other high performance storage. As mentioned, the unique hash codes can help the segments to be relatively randomly and evenly spread across the various storage partitions. A determination can be made 614 as to whether there are any rules, policies, or lifecycles that pertain to the event, as may have been provided with the asset or otherwise identified by the customer or another such entity. The applicable rules or lifecycle in some embodiments can be determined based upon one or more values for metadata associated with the asset. If there are applicable rules or lifecycles, the rule or lifecycle data can be stored 616 and associated with the asset. The asset can then be enabled 618 to be accessible through the storage service.

Figure 7:
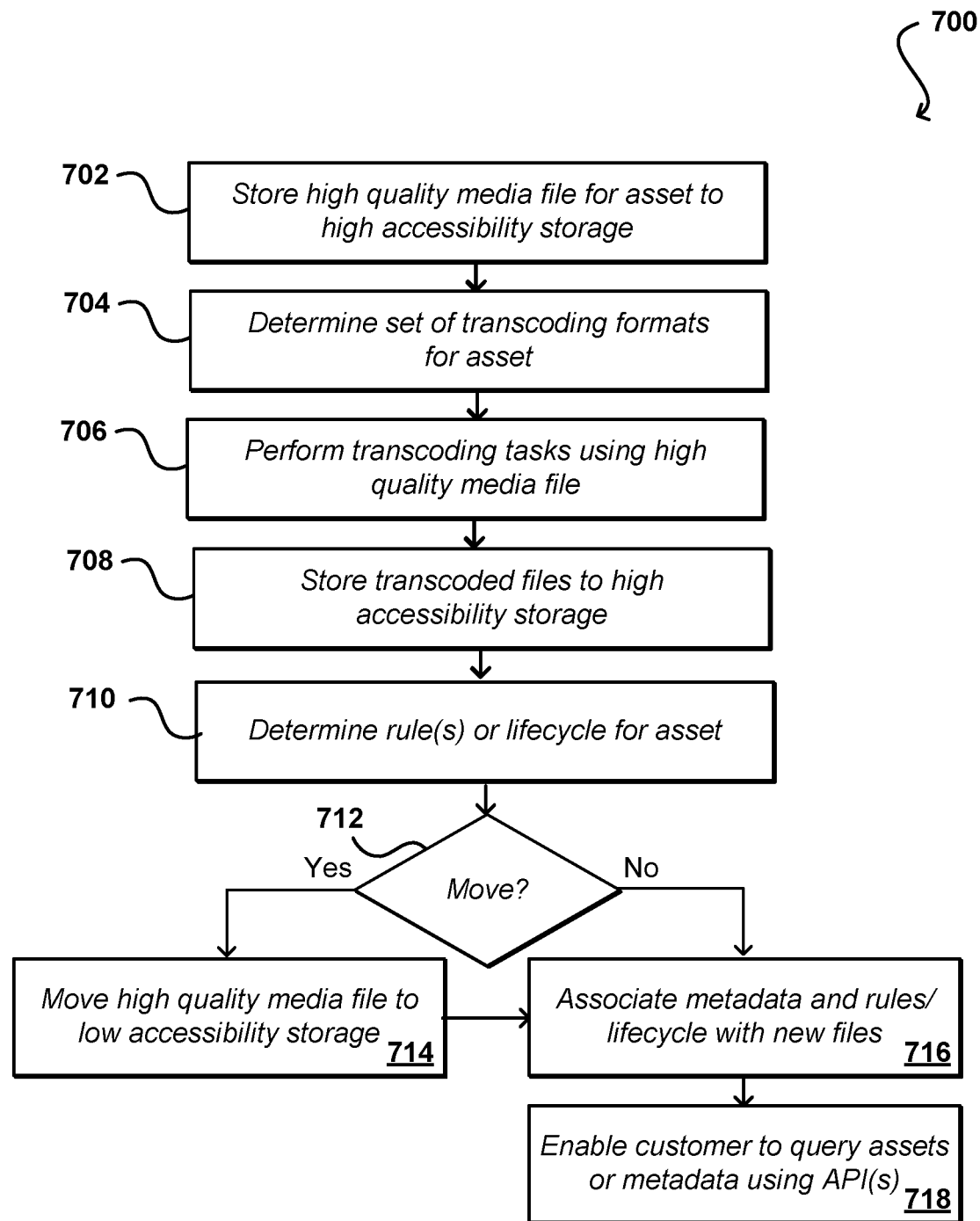
FIG. 7 illustrates an example process for enforcing a lifecycle on an asset stored by a storage service that can be utilized in accordance with various embodiments.

FIG. 7 illustrates an example process 700 for managing a lifecycle for a media asset storage by a storage service that can be utilized in accordance with various embodiments. In this example, the high quality media file for the asset is stored to high accessibility storage using a process such as that described with respect to FIG. 6. As part of the lifecycle for the asset or in response to a request from a customer, among other such options, a set of transcoding formats for the asset can be determined 704. Encoding formats can include, for example, NTSC, PAL, SECAM, MP3, WAV, and UTF, among others. Using the high quality media file stored to high accessibility storage, the transcoding tasks can be performed 706 using a transcoding engine having access to the media file. The transcoded files can then be stored 708 to the high accessibility storage for access by authorized users. As part of the transcoding process, any rules, policies, or lifecycles applicable to the asset can be determined 710. A determination can be made 712 as to whether the media file is to be moved out of high accessibility (and expensive) storage once the transcoding is complete (or in response to another appropriate action, event, or occurrence). If so, the high quality media file can be moved 714 to lower accessibility storage that will cost less to store the high quality media file. The transcoded files can remain in high accessibility storage, in order to enable users to access the files and because the files will be highly compressed and thus less expensive to store than the high quality file. The metadata and any rules, policies, or lifecycle data can be associated 716 with the high quality file in low accessibility storage and the transcoded files in high accessibility storage, and customers can be enabled 718 to query or download the assets or metadata using the appropriate system API(s).

Figure 8:
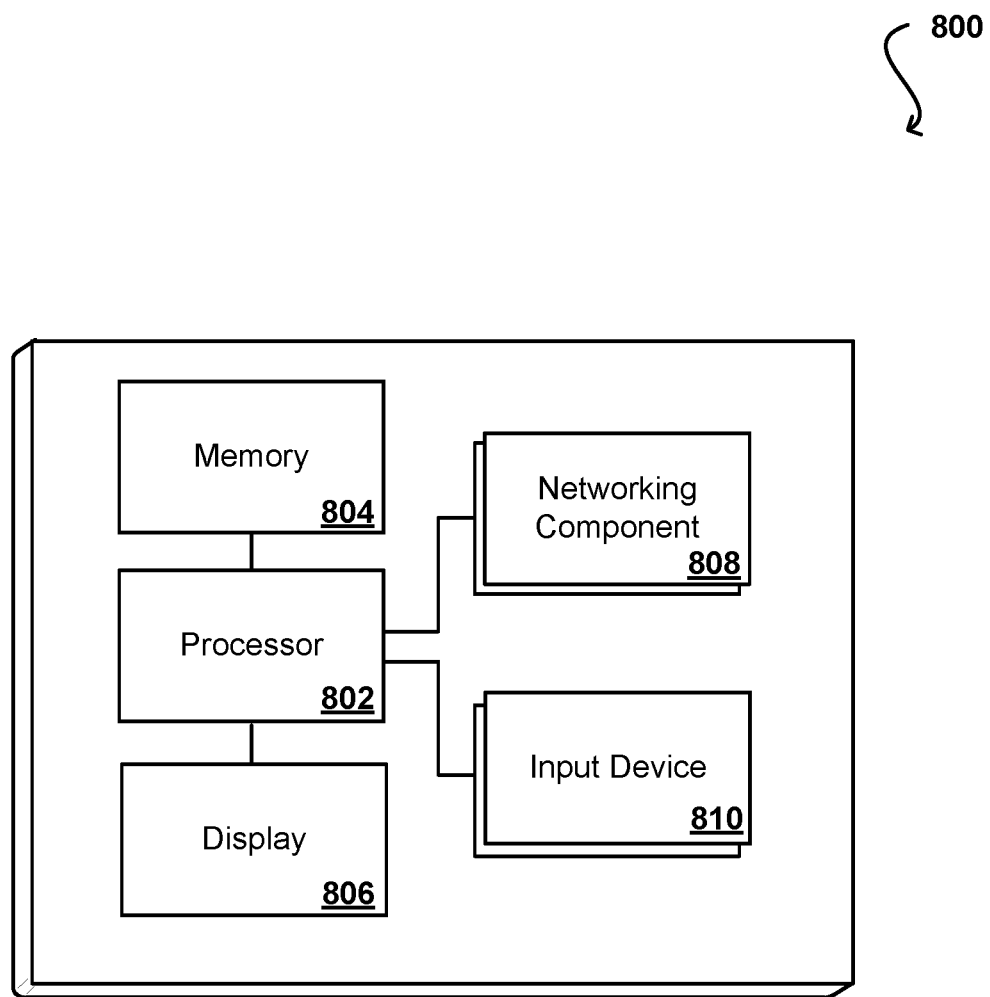
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, to a storage system including a first type of storage, an asset including a mezzanine file and one or more related files;
   extracting metadata from the asset;
   associating the metadata with the mezzanine file and with the one or more related files as stored in the storage system;
   determining a workflow to be applied for the asset, the workflow being associated with the mezzanine file, the one or more related files, and any subsequently generated files associated with the asset in the storage system, wherein the workflow comprises at least a transcoding operation comprising transcoding the mezzanine file into one or more transcoded files of formats specified by the workflow;
   detecting an event corresponding to completion of the transcoding operation;
   moving the mezzanine file to a second type of storage based on the event, the second type of storage including lower accessibility than the first type of storage; and
   associating the metadata with the one or more transcoded files.

2. The computer-implemented method of claim 1, further comprising:
   creating, for the asset, at least one hierarchical primitive relating to the mezzanine file and the one or more related files; and
   associating the workflow and the metadata with the at least one hierarchical primitive, wherein the workflow and the metadata are automatically associated with the mezzanine file, the one or more related files, and the subsequently generated files and wherein actions of the workflow can be applied according to the at least one hierarchical primitive.

3. The computer-implemented method of claim 2, further comprising:
   providing one or more tools enabling a user to interact with the asset according to the at least one hierarchical primitive, wherein an action performed in response to user input through the one or more tools is performed at an asset level or a sub-asset level of the hierarchical primitive.

4. The computer-implemented method of claim 2, further comprising:
   determining at least one of a rule, a policy, or a lifecycle corresponding to the mezzanine file; and triggering the moving of the mezzanine file to the second type of storage in response to the event, the second type of storage specified as part of the at least one of a rule, a policy, or a lifecycle.

5. The computer-implemented method of claim 1, further comprising causing a workflow to be performed in response to a user call to an application programming interface (API) or an action triggered by a rules engine managing the workflow on behalf of the asset.

6. The computer-implemented method of claim 1, further comprising
storing the metadata associated with the mezzanine file to the second type of storage and storing the one or more transcoded files to the first type of storage.

7. The computer-implemented method of claim 1, further comprising:
determining a filename for the media asset;
segmenting the mezzanine file into a sequence of segments;
determining a variation of the filename for each segment of the sequence; and
generating a unique hash code for each segment of the sequence using a hashing algorithm that considers an entirety of each variation.

8. The computer-implemented method of claim 1, further comprising:
indexing the mezzanine file based at least in part upon time code information extracted from the mezzanine file; and
providing an interface enabling querying of the mezzanine file based at least in part upon the time code information.

9. The computer-implemented method of claim 1, further comprising:
receiving the mezzanine file to a proxy service for the storage system, the proxy service having a dedicated address for receiving the mezzanine file.

10. The computer-implemented method of claim 1, wherein the metadata includes at least one of a title, format, bitrate, or file size for the mezzanine file.

11. A storage system, comprising:
at least one processor;
a first type of storage;
a second type of storage including lower accessibility than the first type of storage; and
memory including instructions that, when executed by the at least one processor, cause the storage system to:
receive, to a storage system, an asset including a mezzanine file and one or more related files;
extract metadata from the asset;
store at least the mezzanine file to the first type of storage;
associate the metadata with the mezzanine file and with the one or more related files in the storage system;
obtain a workflow to be applied for the asset, the workflow being associated with the mezzanine file, the one or more related files, and any subsequently generated files associated with the asset in the storage system, wherein the workflow comprises at least a transcoding operation comprising transcoding the mezzanine file into one or more transcoded files with formats specified by the workflow;
detect an event corresponding to completion of the transcoding operation;
move the mezzanine file to a second type of storage based on the event; and
associate the metadata with the one or more transcoded files.

12. The storage system of claim 11, wherein the instructions when executed further cause the system to:
create, for the asset, at least one hierarchical primitive relating to the mezzanine file, the one or more related files, and the subsequently generated files; and
associate the workflow and the metadata with the at least one hierarchical primitive, wherein the workflow and the metadata are automatically associated with the mezzanine file, the one or more related files, and the subsequently generated files and actions of the workflow can be applied according to the at least one hierarchical primitive.

13. The storage system of claim 11, wherein the instructions when executed further cause the system to:
receive a set of advertisements to be displayed with the asset;
causing the advertisements to be modified to match at least one of a video quality or an audio quality of a transcoded file generated using the mezzanine file; and
causing the advertisement to be displayed during playback of the transcoded file.

14. The storage system of claim 11, wherein the instructions when executed further cause the system to:
store the metadata associated with the mezzanine file to the second type of storage and store the one or more transcoded files to the first type of storage.

15. The storage system of claim 11, wherein the instructions when executed further cause the system to:
determine a filename for the media asset;
segment the mezzanine file into a sequence of segments;
determine a variation of the filename for each segment of the sequence; and
generate a unique hash code for each segment of the sequence using a hashing algorithm that considers an entirety of each variation.

16. A non-transitory computer readable storage medium storing instructions that, when executed by at least one processor of a computing device, cause the computing device to:
receive, to a storage system, an asset including a mezzanine file and one or more related files;
extract metadata from the asset;
store at least the mezzanine file to a first type of storage of the storage system;
associate the metadata with the mezzanine file and with the one or more related files in the storage system;
obtain a workflow to be applied for the asset, the workflow being associated with the mezzanine file, the one or more related files, and any subsequently generated files associated with the asset in the storage system, wherein the workflow comprises at least a transcoding operation comprising transcoding the mezzanine file into one or more transcoded files with formats specified by the workflow;
detect an event corresponding to completion of the transcoding operation
move the mezzanine file to a second type of storage based on the event, the second type of storage including lower accessibility than the first type of storage; and
associate the metadata with the one or more transcoded files.

17. The non-transitory computer readable storage medium of claim 16, wherein the instructions, when executed by the at least one processor, further cause the computing device to:

create, for the asset, at least one hierarchical primitive relating to the mezzanine file, the one or more related files, and the subsequently generated files; and associate the workflow and the metadata with the at least one hierarchical primitive, wherein the workflow and the metadata are automatically associated with the mezzanine file, the one or more related files, and the subsequently generated files and actions of the workflow can be applied according to the at least one hierarchical primitive.

18. The non-transitory computer readable storage medium of claim 16, wherein the instructions, when executed by the at least one processor, further cause the computing device to:

receive a set of advertisements to be displayed with the asset;

causing the advertisements to be modified to match at least one of a video quality or an audio quality of a transcoded file generated using the mezzanine file; and causing the advertisement to be displayed during playback of the transcoded file.

19. The non-transitory computer readable storage medium of claim 16, wherein the instructions, when executed by the at least one processor, further cause the computing device to:

store the metadata associated with the mezzanine file to the second type of storage and store the one or more transcoded files to the first type of storage.

20. The non-transitory computer readable storage medium of claim 16, wherein the instructions, when executed by the at least one processor, further cause the computing device to:

determine a filename for the media asset;

segment the mezzanine file into a sequence of segments;

determine a variation of the filename for each segment of the sequence; and generate a unique hash code for each segment of the sequence using a hashing algorithm that considers an entirety of each variation.

* * * * *